(12) United States Patent
Wehner et al.

(10) Patent No.: US 7,980,514 B2
(45) Date of Patent: Jul. 19, 2011

(54) SOLAR ARRAY MOMENTUM CONTROL

(75) Inventors: James Wehner, Torrance, CA (US);
Lael Rudd, Redondo Beach, CA (US);
Christian Harris, Manhattan Beach, CA (US); Shahram Foroozan, Beverly Hills, CA (US)

(73) Assignee: Northrop Grumman Space & Mission Systems Corp., Los Angeles, CA (US)

( * ) Notice: Subject to any disclaimer, the term of this patent is extended or adjusted under 35 U.S.C. 154(b) by 712 days.

(21) Appl. No.: 12/048,981

(22) Filed: Mar. 14, 2008

(65) Prior Publication Data
US 2009/0230250 A1    Sep. 17, 2009

(51) Int. Cl.
*B64G 1/24* (2006.01)
*B64G 1/44* (2006.01)
(52) U.S. Cl. ............... 244/168; 244/164; 244/172.7; 136/292
(58) Field of Classification Search ............... 244/172.7, 244/172.8, 164, 168; 136/243, 244, 245, 136/292, 915
See application file for complete search history.

(56) References Cited

U.S. PATENT DOCUMENTS

| | | | | |
|---|---|---|---|---|
| 5,133,518 A * | 7/1992 | Flament | ............... | 244/168 |
| 5,626,315 A * | 5/1997 | Flament et al. | ............... | 244/168 |
| 5,794,891 A * | 8/1998 | Polle et al. | ............... | 244/164 |
| 6,164,597 A * | 12/2000 | Barker et al. | ............... | 244/168 |
| 6,481,671 B1 * | 11/2002 | Blair | ............... | 244/168 |
| 6,921,050 B2 * | 7/2005 | Wehner et al. | ............... | 244/168 |
| 7,185,856 B2 * | 3/2007 | Bang et al. | ............... | 244/168 |
| 7,219,860 B2 * | 5/2007 | Wehner et al. | ............... | 244/168 |
| 7,624,949 B2 * | 12/2009 | Leyre | ............... | 244/168 |
| 2006/0038080 A1 * | 2/2006 | Polle | ............... | 244/168 |
| 2006/0169844 A1 * | 8/2006 | Clerc et al. | ............... | 244/168 |

* cited by examiner

*Primary Examiner* — Joshua J Michener
*Assistant Examiner* — Steven Hawk
(74) *Attorney, Agent, or Firm* — Tarolli, Sundheim, Covell & Tummino LLP

(57) ABSTRACT

One embodiment of the invention includes a spacecraft. The spacecraft comprises at least one solar array panel comprising an array of solar cell sections. Each of the solar cell sections can be configured to generate electrical power from received solar radiation. The spacecraft also comprises a solar array selection controller configured to selectively deactivate a portion of the array of solar cell sections to generate a torque on the spacecraft based on a difference in at least one of solar and thermal radiation pressure between an activated portion of the array of solar cell sections and the deactivated portion of the array of solar cell sections.

20 Claims, 6 Drawing Sheets

SOLAR ARRAY MOMENTUM CONTROL

TECHNICAL FIELD

The present invention relates generally to spacecraft, and more particularly to solar array momentum control.

BACKGROUND

Spacecraft that are launched into space are typically designed with one or more devices or systems that allow the spacecraft to unload accumulated angular momentum. As an example, even in space, a spacecraft can be subject to a number of perturbing environmental forces. One such force, such as affecting satellites in a low-earth orbit (LEO), can be a magnetic force resulting from an interaction between currents that are generated within the spacecraft and the magnetism of the poles of the celestial body. Another such force can include solar pressure that is applied to the spacecraft from solar radiation being reflected from the body of the spacecraft. Thus, the spacecraft may be configured to accumulate and unload angular momentum in order to counteract the perturbing environmental forces that are applied in space.

In addition, a typical spacecraft may need to generate electrical energy to power onboard avionics. As an example, a spacecraft may include solar array panels that that convert solar radiation into electrical energy. Accordingly, the spacecraft may implement a device that orients the solar array towards the sun in a manner so as to optimize the amount of solar radiation that is incident on the solar array panels throughout the orbit.

FIG. 1 demonstrates an example of a typical spacecraft system 10. The system 10 demonstrates a spacecraft 12, demonstrated in the example of FIG. 1 as a satellite, in an orbital pattern 14 around Earth 16. The orbital pattern could be a geosynchronous earth orbit (GEO), such that the spacecraft 12 is orbiting Earth 16 at an approximately equatorial orbit, as demonstrated in the example of FIG. 1. The spacecraft 12 is demonstrated in four separate locations in the orbital pattern 14. At each of the four locations, the spacecraft 12 is oriented such that solar array panels 18 on the spacecraft 12 are positioned to optimize the receipt of solar radiation, demonstrated as dashed lines 20, from the Sun 22. The solar radiation can thus be converted into electrical power to drive a load and/or to charge a battery, such that the spacecraft 12 can still drive the load when the solar radiation is unavailable, such as in a shadow region 24 behind Earth 16 relative to the Sun 22.

In order to maintain the orientation of the spacecraft 12 to optimize the receipt of solar radiation and in order to counteract perturbing environmental forces, such as solar pressure from the solar radiation 20, the spacecraft 12 can include one or more systems for accumulating and unloading momentum to maintain a direction of pointing of the spacecraft. As an example, the spacecraft 12 can include one or more reaction wheels that can be commanded to spin to generate a torque, or angular momentum vector relative to a center of mass to rotate the spacecraft 12, such as to counteract the environmental torque on the spacecraft 12 and maintain a directional vector of the spacecraft 12. However, the momentum that can be accumulated by the reaction wheels is finite, such that the reaction wheels can saturate, and thus may not be able to accumulate additional momentum and maintain spacecraft pointing. Therefore, the spacecraft 12 can also include thrusters disposed along the body of the spacecraft that can be ignited to unload momentum from the reaction wheels. However, the additional momentum unloading thrusters, along with the associated fuel, occupy significant space and weight on the spacecraft 12. Furthermore, the amount of fuel for the momentum unloading thrusters is also finite, which could effectively shorten the mission life of the spacecraft 12.

SUMMARY

One embodiment of the invention includes a spacecraft. The spacecraft comprises at least one solar array panel comprising an array of solar cell sections. Each of the solar cell sections can be configured to generate electrical power from received solar radiation. The spacecraft also comprises a solar array selection controller configured to selectively deactivate a portion of the array of solar cell sections to generate a torque on the spacecraft based on a difference in at least one of solar and thermal radiation pressure between an activated portion of the array of solar cell sections and the deactivated portion of the array of solar cell sections.

Another embodiment of the invention includes a method for controlling momentum in a spacecraft. The method comprises collecting solar radiation on at least one solar array panel that comprises an array of solar cell sections. The method also comprises generating electrical power in response to the solar radiation at each of an activated portion of the array of solar cell sections, and determining a necessary torque to provide rotational motion of the spacecraft. The method further comprises selectively switching a location of a deactivated portion of the array of solar cell sections on the at least one solar array panel to generate a torque on the spacecraft based on a difference in at least one of solar and thermal radiation pressure between the activated portion of the array of solar cell sections and the deactivated portion of the array of solar cell sections, the torque being commensurate with the necessary torque to provide the rotational motion of the spacecraft.

Another embodiment of the invention includes a spacecraft. The spacecraft comprises plural means for converting solar radiation into electrical power. The spacecraft also comprises means for selectively deactivating a portion of the plural means for converting in a manner that is asymmetrical about at least one of two axes of the spacecraft to generate a torque on the spacecraft based on a difference in at least one of solar and thermal radiation pressure between an activated portion of the plural means for converting and the deactivated portion of the plural means for converting.

DETAILED DESCRIPTION

The present invention relates generally to spacecraft, and more particularly to solar array momentum control. The spacecraft can include one or more solar array panels, with each of the solar array panels being configured to include an array of solar cell sections. Each of the solar cell sections can include a plurality of solar cell sections that convert solar radiation to electrical power. The spacecraft can include a momentum controller that can determine a necessary amount of angular momentum to adjust based on the attitude of the spacecraft. Upon determining the necessary amount of angular momentum, the momentum controller can implement a cell array selection controller to selectively activate and deactivate the solar cell sections. The solar cell sections can be activated and deactivated in a manner so as to induce a torque on the spacecraft based on a difference in solar and/or thermal radiation pressure between the activated solar cell sections and the deactivated solar cell sections.

Figure 1:
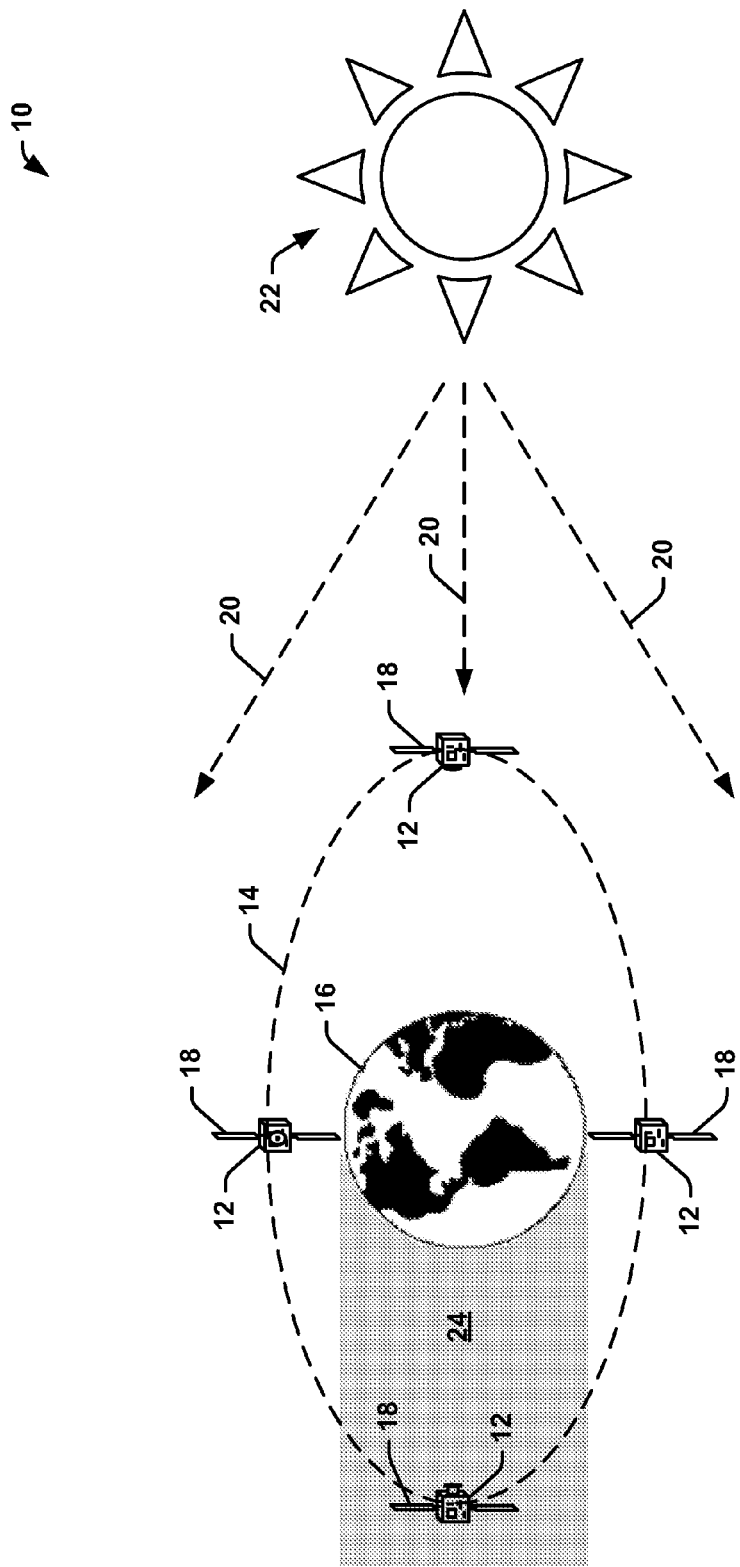
FIG. 1 demonstrates an example of a typical spacecraft system.
Figure 2:
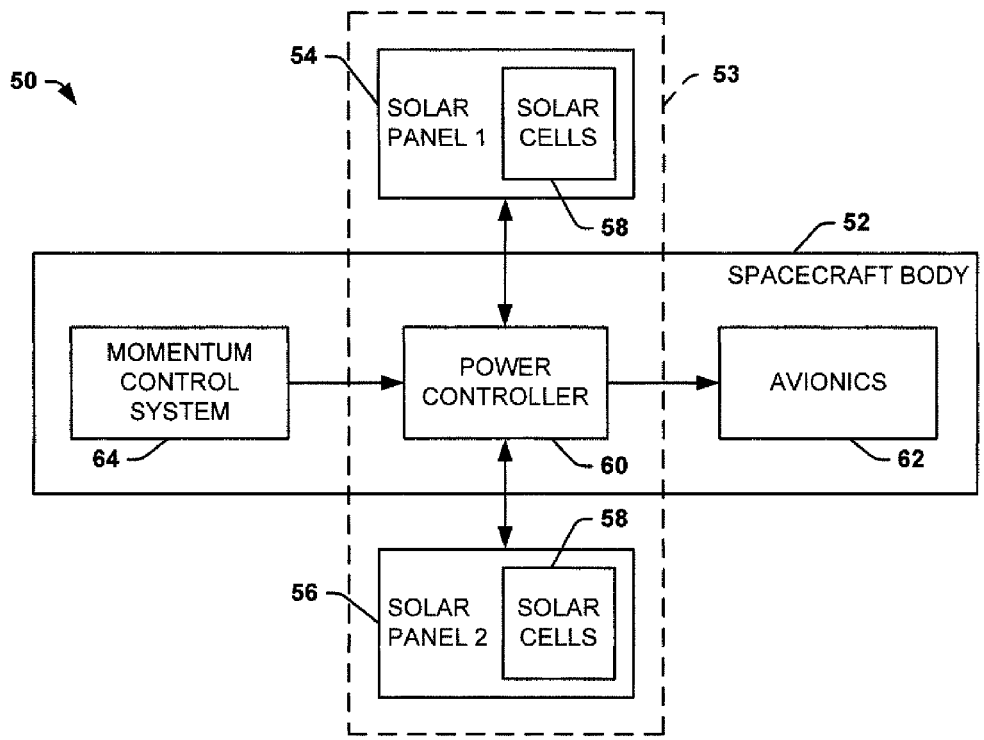
FIG. 2 demonstrates an example of a spacecraft in accordance with an aspect of the invention.

FIG. 2 illustrates an example of a spacecraft 50 in accordance with an aspect of the invention. As an example, the spacecraft 50 could be a satellite, such as travelling in a geosynchronous earth orbit (GEO). The spacecraft 50 includes a body 52 and a power system 53 that includes a first solar array panel 54 and a second solar array panel 56. The first and second solar array panels 54 and 56 can each include an array of solar cell sections 58 for receiving solar radiation, such as from the Sun. The solar cell sections 58 can each convert solar radiation into electrical power, such that power can be provided from each of the solar cell sections 58. As an example, each of the solar cell sections 58 can include a group of solar cells that are connected in series and/or in parallel that each convert the energy of the solar radiation into power.

The power system 53 also includes a power controller 60. The power generated from the solar cell sections 58 of each of the first and second solar array panels 54 and 56 is provided to the power controller 60. The power controller 60 can include one or more power regulators to regulate the power from each of the solar cell sections 58. The regulated power can thus drive avionics 62 of the spacecraft 50, such as communications equipment. As another example, the regulated power can charge a battery (not shown). As such, the battery can provide power to the avionics 62 when solar radiation is not available to solar cell sections 58, such as when the spacecraft 50 enters a shadow of Earth relative to the Sun.

The spacecraft 50 also includes a momentum control system 64. As an example, the momentum control system 64 can include an attitude determination and control subsystem, such that the momentum control system 64 is configured to determine an attitude and to control attitude and momentum of the spacecraft 50, such as to generate a torque that provides directional pointing of the spacecraft 50. As an example, the momentum control system 64 can include a reference unit to determine attitude of the spacecraft, and can implement an algorithm to determine a necessary momentum adjustment based on the determined attitude. For example, based on the determined attitude relative to a predetermined reference, the momentum control system may determine that perturbing environmental forces have acted upon the spacecraft 50, such that the momentum management is required to counteract a torque that has been applied to the spacecraft 50 by the perturbing environmental forces.

To adjust momentum, the momentum control system 64 can initiate the turning of one or more reaction wheels. As an example, the momentum control system 64 can include a three-axis or more reaction wheel assembly, such that the turning of one or more of the reaction wheels can adjust angular momentum within the body 52 of the spacecraft 50 to maintain directional pointing. However, the amount of momentum that can be accumulated by the reaction wheels is finite, such that the amount of reaction wheel angular momentum can saturate, resulting in loss of directional pointing control. Therefore, the momentum control system 64 can also be configured to implement solar array momentum unloading, such that momentum can be unloaded by exploiting solar and thermal radiation pressure on the first and second solar array panels 54 and 56.

It is to be understood that the spacecraft 50 can be designed to provide an amount of power via the solar cell sections 58 that is significantly greater than the power requirements of the spacecraft 50, such as to provide power to the avionics 62. As an example, the power providing capability of the solar cell sections 58 typically degrade substantially asymptotically from the beginning-of-life (BOL) of the spacecraft 50 to the end-of-life (EOL) of the spacecraft 50. As a result, the spacecraft 50 can be designed to include a number of solar cell sections 58 that are capable of providing significantly more power than is necessary to maintain a substantially full payload for worst-case-scenario EOL conditions. Similarly, the solar cell sections 58 may be required to generate more power during an eclipse season than when not in the eclipse season. Accordingly, the power controller 60 can be configured to disconnect unused solar cell sections 58 in the array on each of the first and second solar array panels 54 and 56.

Figure 3:
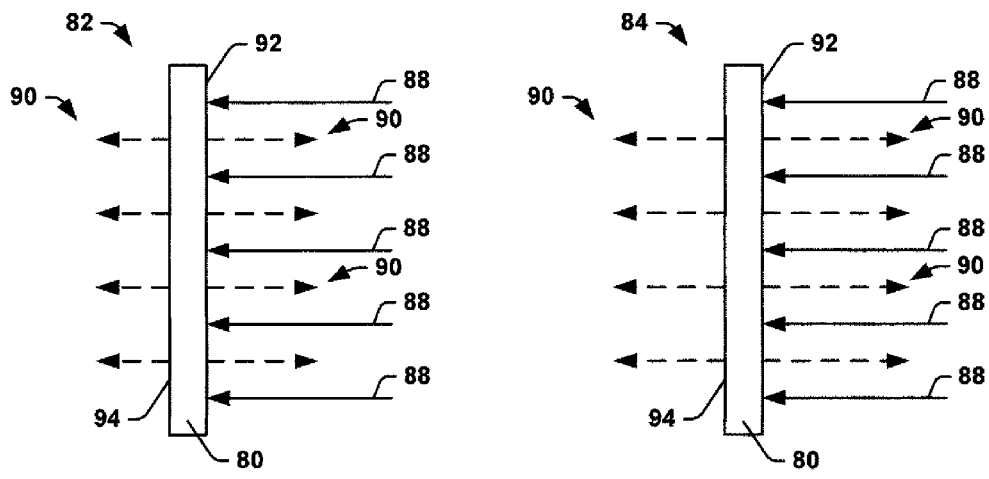
FIG. 3 demonstrates an example of different states of a solar cell section of a spacecraft solar array panel in accordance with an aspect of the invention.

FIG. 3 demonstrates an example of two states of a solar cell section 80 of a spacecraft solar array panel in accordance with an aspect of the invention. The solar cell section 80 can be included in the array of solar cell sections 58 on each of the first and second solar array panels 54 and 56 of the spacecraft 50 in the example of FIG. 2. As an example, the solar cell section 80 can include a series string of solar cell photodiodes that are each configured to generate power in response to solar radiation. As a result, reference is to be made to the example of FIG. 2 in the following discussion of the example of FIG. 3.

The solar cell section 80 is depicted in a side-view in each of the two-states in the example of FIG. 3. The solar cell section 80 is demonstrated in a first state at 82 and a second state at 84. In the first state 82, the solar cell section 80 is providing power to the power controller 60. Accordingly, the solar cell section 80 is activated in the first state 82, which is thus a converting state. In the second state 84, the solar cell section 80 is deactivated, such that it is not providing power to the power controller 60. Accordingly, the solar cell section 80 is thus an un-converting state.

In the example of FIG. 3, solar radiation 88 is depicted as being provided to the solar cell section 80. The total amount of energy of the solar radiation 88 that is absorbed and re-radiated from the solar cell section 80 is proportional to a solar absorptance characteristic, $\alpha_{SOLAR}$, of the solar cell section 80. However, based on whether or not energy is drawn away from the solar cell section 80 by converted electrical power, the solar absorptance $\alpha_{SOLAR}$ can thus change based on whether the solar cell section 80 is activated or deactivated (i.e., in a converting state or an un-converting state). For example, in the first state 82, the solar cell section 80 is converting, and thus can exhibit a solar absorptance $\alpha_{SOLAR}$ of approximately 0.75. By contrast, in the second state 84, the solar cell section 80 is un-converting, and thus can exhibit a solar absorptance $\alpha_{SOLAR}$ of approximately 0.92. Therefore, the solar cell section 80 has a lower solar absorptance $\alpha_{SOLAR}$ in the first state 82 based on the electrical power being drawn away from the solar cell section 80. Accordingly, the solar cell section 80 absorbs and re-radiates more total energy in the second state 84 because there is no energy loss in the form of converted power. This difference in the total energy that is absorbed and re-radiated is demonstrated in the example of FIG. 3 by the dashed lines 90. Specifically, the dashed lines 90 demonstrate an amount of energy diagrammatically based on a comparative length of the dashed lines 90, such that comparatively longer dashed lines 90 represent more radiated energy both from a front-side 92 of the solar cell section 80 and a back-side 94 of the solar cell section 80.

The energy of the solar radiation 88 that is provided to the solar cell section 80 can induce a temperature gradient between the front-side 92 and the back-side 94 of the solar cell section 80. The temperature gradient can be proportional to the amount of energy that is re-radiated from the solar cell section 80, which as described above, is a function of whether the solar cell section 80 is in the first state 82 or the second state 84. Thus, the amount of thermal radiation from the front-side 92 and the back-side 94 of the solar cell section 80, both absolute and differential in terms of fraction of total energy, differs between the converting first state 82 and the un-converting second state 84. Differential temperatures on multiple solar cell sections 58 on the array can thus generate different net forces resulting from thermal radiation pressure on the multiple solar cell sections 58 based on whether the solar cell sections 58 are activated or deactivated (i.e., converting or un-converting, respectively). As a result, the momentum control system 64 can be configured to control which of the solar cell sections 58 are activated and deactivated in each of the first and second solar array panels 54 and 56 to control the relative forces on the solar cell sections 58. Accordingly, the momentum control system 64 can generate a torque on the body 52 of the spacecraft 50 based on which of the solar cell sections 58 are activated and deactivated.

The thermal radiation pressure that is exerted on the solar cell section 80 temperature gradient between the front-side 92 and the back-side 94 of the solar cell section 80, assuming a Lambertian emission profile as an example, is described by the following expression:

$$P = ((\epsilon_{Front} * T^4_{Front} - \epsilon_{Back} * T^4_{Back}) * \sigma * (2/\pi))/c \quad \text{Equation 1}$$

Where:
P=Pressure
T=Temperature (front-side and back-side, respectively)
$\epsilon$=Emissivity (front-side and back-side, respectively)
$\sigma$=Stephen-Boltzmann Constant
c=Speed of Light Therefore, a torque associated with the thermal radiation pressure is described by the following expression:

$$\text{Torque} = (P_{Conv} * A * MA) - (P_{Unconv} * A * MA) \quad \text{Equation 2}$$

Where:
$P_{Conv}$=Pressure of an activated (i.e., converting) solar cell
$P_{Unconv}$=Pressure of a deactivated (i.e., unconverting) solar cell
A=Area of the solar cell
MA=Moment Arm=Distance from center of mass Accordingly, a differential torque can be obtained based on the following expression:

$$\text{Differential Torque} = \text{Torque}_{Unconv} - \text{Torque}_{Conv} \quad \text{Equation 3}$$

Where:
$\text{Torque}_{Unconv}$=Torque of deactivated (i.e., unconverting) solar cell
$\text{Torque}_{Conv}$=Torque of activated (i.e., converting) solar cell Based on the above described calculations, it is demonstrated that momentum can be unloaded for the spacecraft 50 based on a differential torque that is created on the solar cell sections 58 of the first and second solar array panels 54 and 56. Therefore, as demonstrated in the example of FIG. 2, the momentum control system 64 is configured to provide commands to the power controller 60 to selectively activate and deactivate the solar cell sections 58 of the first and second solar array panels 54 and 56 to generate the necessary differential torque to adjust momentum. Accordingly, the spacecraft 50 can implement the momentum control system 64 as a replacement for other momentum adjustment devices, such as thrusters, or to reduce the momentum storage requirements for other momentum storage devices. As a result, the spacecraft 50 can conserve physical space and weight, which can further reduce cost associated with the spacecraft 50.

It is to be understood that the spacecraft 50 is not intended to be limited to the example of FIG. 2. As an example, the spacecraft 50 is not limited to two solar array panels 54 and 56, but could include a single solar array panel or could include three or more solar array panels. In addition, it is to be understood that the spacecraft 50 is depicted simplistically in the example of FIG. 2 for the sake of brevity. As such, the spacecraft 50 can include any of a variety of additional components that are not described with regard to the example of FIG. 2. Accordingly, the spacecraft 50 can be configured in any of a variety of ways.

In addition, as described in the example of FIG. 3 and as described hereinafter, a given solar cell 80 is demonstrated as being in one of two states (i.e., converting and un-converting) for purposes of adjusting solar momentum. However, it is to be understood that the solar cell section 80 is not limited to two states of operation. As an example, the electrical power that is drawn from the solar cell section 80 can be regulated, such as via pulse-width modulation. As a result, a variable amount of electrical power can be drawn from the solar cell section 80, from a complete un-converting state, thus providing 0% of maximum power, to a complete converting state, thus providing 100% maximum power, or to a partially converting state to provide any amount of power therebetween. As a result, the momentum control system 64 can be configured to set one or more of the solar cell sections 58 as partially converting, such as to provide fine adjustments to the torque of the spacecraft 50.

Figure 4:
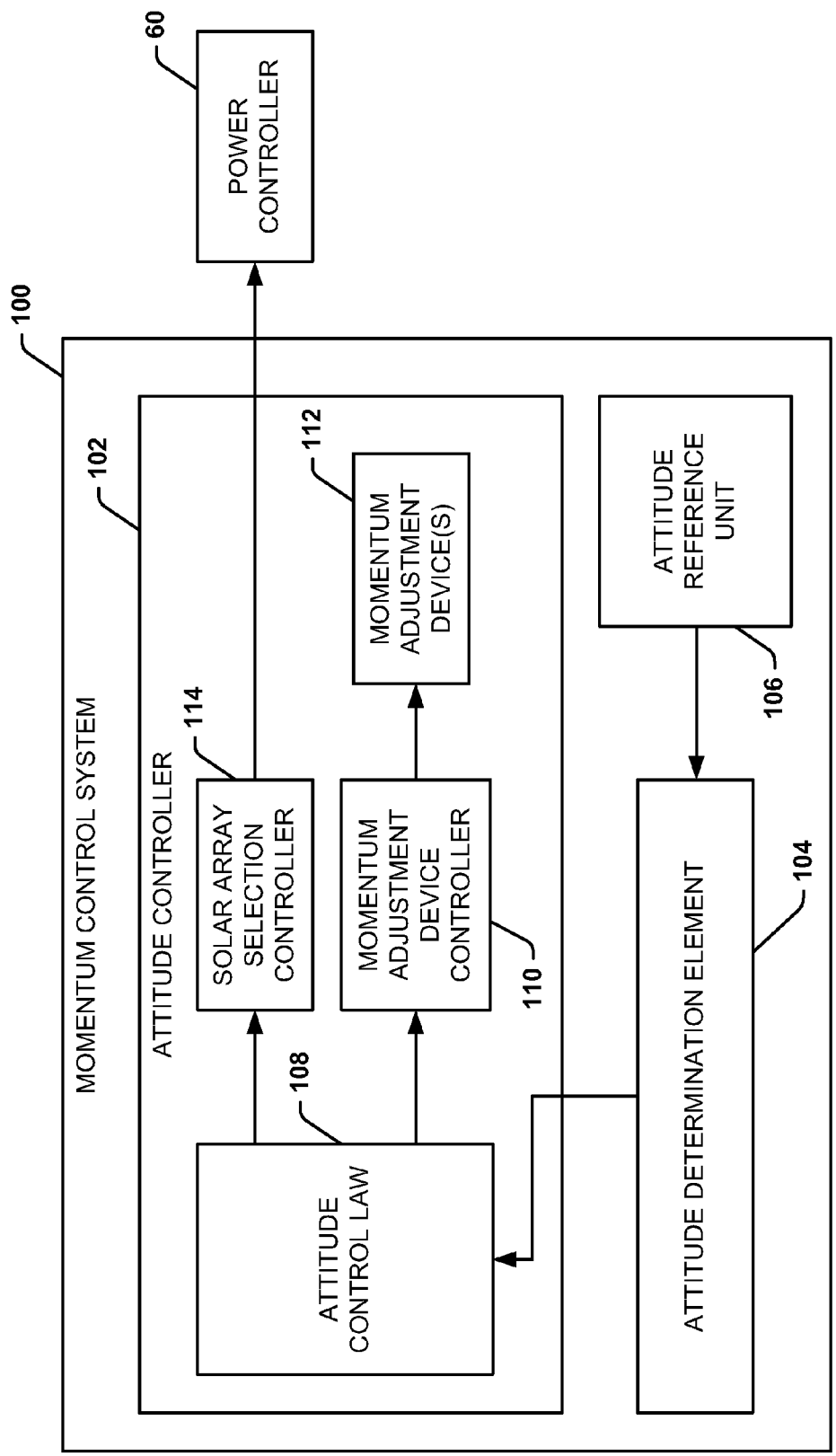
FIG. 4 demonstrates an example of a momentum control system in accordance with an aspect of the invention.

FIG. 4 demonstrates an example of a momentum control system 100 in accordance with an aspect of the invention. The momentum control system 100 can be implemented in a spacecraft, such as the spacecraft 50 in the example of FIG. 2. Therefore, reference is to be made to the example of FIG. 2 in the following discussion of the example of FIG. 3.

The momentum control system 100 includes an attitude controller 102 and an attitude determination element 104. The attitude controller 102 can be configured to adjust momentum to maintain pointing control of the spacecraft 50, such as by adjusting a necessary amount of momentum to orient the spacecraft in a desired direction and/or to unload accumulated momentum to counteract perturbing environmental forces acting upon the spacecraft 50. In controlling the momentum of the spacecraft 50, the attitude controller 102 is configured to interface with the attitude determination element 104. In the example of FIG. 4, an attitude reference unit 106 provides data associated with motion of the spacecraft 50 to the attitude controller 102. As an example, the attitude reference unit 106 can include one or more sensors or devices, such as star trackers and/or an inertial reference device, to provide the data associated with attitude of the spacecraft 50. As a result, the attitude determination element 104 can determine the attitude of the spacecraft 50 based on the data provided from the attitude reference unit 106.

The attitude data of the spacecraft 50 is provided from the attitude determination element 104 to a attitude control law 108. The attitude control law 108 is configured to calculate a necessary momentum adjustment for the spacecraft 50 based on the attitude data. For example, the attitude control law 108 could receive instructions that the spacecraft 50 needs to be oriented a specific direction for mission operations. As such, the calculation of necessary momentum adjustment includes reference values associated with current movement, as provided by the attitude determination element 104. As another example, the attitude and inertia of the spacecraft 50 provided by the attitude determination element 104 can correspond to motion resulting from perturbing environmental forces affecting the spacecraft 50 relative to reference values of attitude. As such, the necessary momentum adjustment calculated by the attitude control law 108 can be a momentum necessary to counteract the perturbing environmental forces.

The necessary momentum adjustment information is provided from the attitude control law 108 to one or more momentum adjustment components. In the example of FIG. 4, the attitude controller 102 includes a momentum adjustment device controller 110. The momentum adjustment device controller 110 can be configured to provide commands to one or more momentum adjustment devices 112. The momentum adjustment devices 112 can includes any of a variety of devices to accumulate and/or unload angular momentum that generates a torque within the body 52 of the spacecraft 50, such as momentum wheels, reaction wheels, control moment gyros, magnetic torque rods, and/or thrusters. As an example, the momentum adjustment device controller 110 can calculate an angular velocity at which the one or more reaction wheels, such as can be included in the momentum adjustment device(s) 112 is to turn, based on the information provided from the attitude control law 108. As another example, the attitude control law 108 can provide the angular rate information to the momentum adjustment device controller 110.

The attitude controller 102 also includes a solar array selection controller 114. The solar array selection controller 114 is configured to provide solar array selection commands to the power controller 60, such that the solar cell sections 58 of the first and second solar array panels 54 and 56 can be selectively activated to generate a torque. In addition, the solar array selection controller 114 can also calculate timing information with regard to the duration of deactivation of specific solar cell sections 58, such that the torque can be changed and controlled for more precise control of the attitude of the spacecraft 50. As an example, pre-biasing the torque of the spacecraft 50 based on calculated timing information can be implemented to limit angular rate accumulation when excess power is limited or in an eclipse environment, thus improving the directional pointing or limiting angular momentum storage requirements.

As an example, the solar array selection controller 114 can calculate which portion of the solar cell sections are to be deactivated to generate a torque on the spacecraft 50 necessary to satisfy the necessary momentum. As another example, the attitude control law 108 can calculate and provide the solar cell selection information to the solar array selection controller 114, such that the solar array selection controller 114 provides the appropriate commands to the power controller 60. It is to be understood that the attitude control law 108 can provide necessary momentum information or portions of the necessary momentum information to both the momentum adjustment device controller 110 and the solar array selection controller 114 to coordinate the contributions of the necessary momentum adjustments between the two momentum adjusting components.

It is to be understood that the momentum control system 100 is not intended to be limited to the example of FIG. 4. As an example, the attitude determination element 104, the attitude control law 108, the momentum adjustment device controller 110, and/or the solar array selection controller 114 can each be software routines within the attitude controller 102, or can be included as separate hardware and software processing systems in the momentum control system 100. In addition, the attitude controller 102 is not limited to including both the momentum adjustment device controller 110 and the solar array selection controller 114. Specifically, the attitude controller 102 could include just the solar array selection controller 114 and no additional momentum adjusting components, or could include any of a combination of different types of momentum adjusting components including the solar array selection controller 114, such that the solar array selection controller 114 can provide momentum adjustments that augment the operation of thrusters, gravity gradient controllers, and/or reaction wheels. Accordingly, the momentum control system 100 can be configured in any of a variety of ways.

Figure 5:
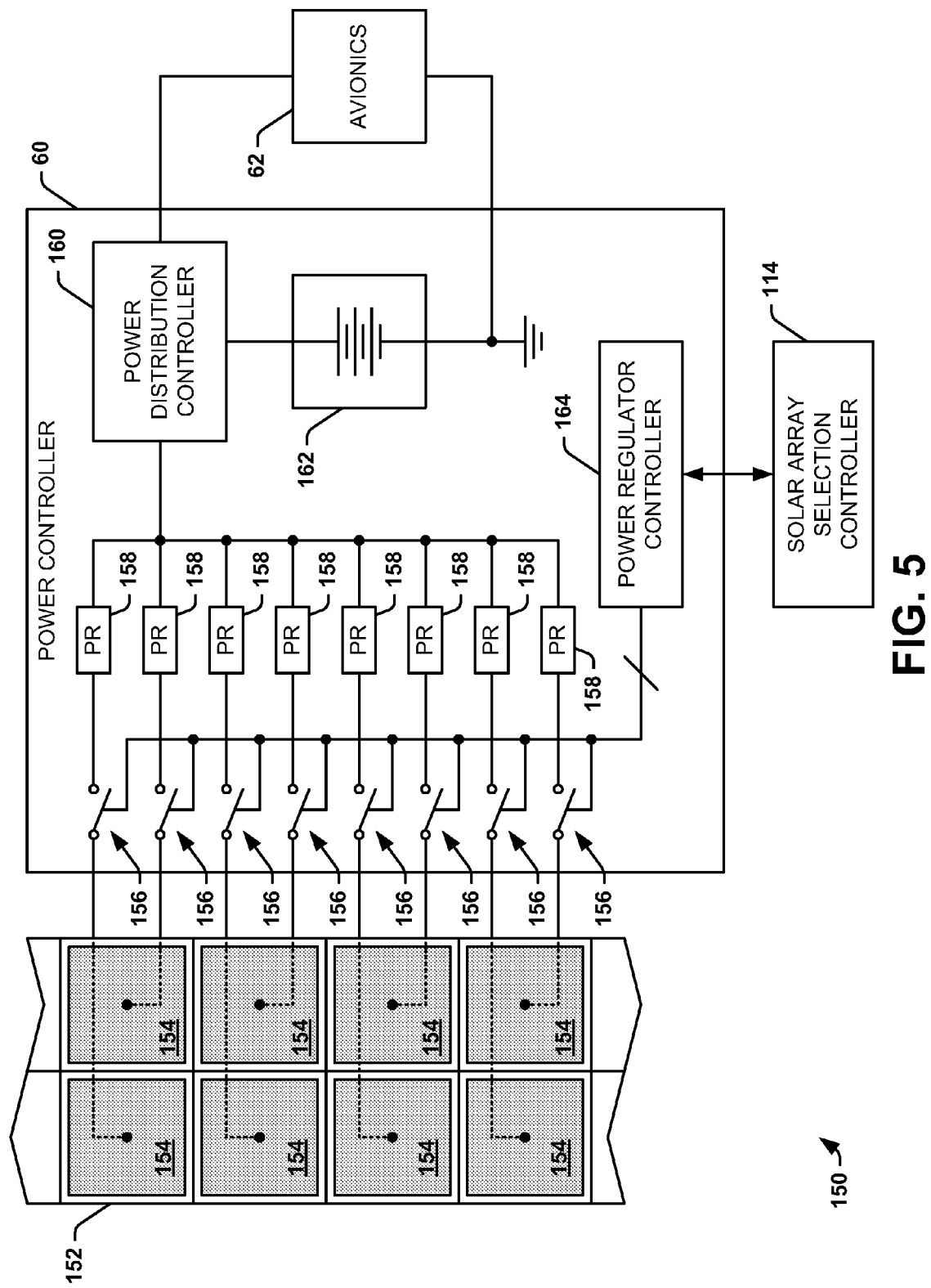
FIG. 5 demonstrates an example of a spacecraft power system in accordance with an aspect of the invention.

FIG. 5 demonstrates an example of a power system 150 in accordance with an aspect of the invention. The power system 150 can be included in the spacecraft 50 in the example of FIG. 2. As such, reference is to be made to the example of FIG. 2, as well as the example of FIG. 4, and like reference numbers are to be used in the following discussion of the example of FIG. 5.

The power system 150 includes a portion of a solar array panel 152, which could be either the first solar array panel 54 or the second solar array panel 56 in the example of FIG. 2. The solar array panel 152 includes a plurality of solar cell sections 154. The solar cell sections 154 can each convert solar radiation into electrical power, such that electrical power can be provided from each of the solar cell sections 154. As an example, each of the solar cell sections 154 can include a series and/or parallel connection of solar cell photodiode strings to convert the energy of the solar radiation into electrical power. The electrical power from each of the solar cell sections 154 is provided to the power controller 60. The power controller 60 includes a plurality of switches 156 that each individually couple the solar cell sections 154 to a respective plurality of power regulators 158, each demonstrated in the example of FIG. 5 as "PR". As an example, each of the power regulators 158 can be configured as pulse-width modulation power converters.

The regulated power that is provided from each of the power regulators 158 is provided to a power distribution controller 160. The power distribution controller 160 is configured to distribute the power based on operating conditions of the spacecraft 50. As an example, at times that the spacecraft 50 receives solar radiation at the solar array panel 152, such that power is provided from the power regulators 158, the power distribution controller 160 can provide the power to both the avionics 62 of the spacecraft 50 and to a battery 162. Thus, the battery 162 can be charged while the power converted from the solar cell sections 154 is provided to the avionics 62. As another example, at times that the spacecraft 50 is not receiving solar radiation, such as while occupying an eclipsed portion of Earth orbit or before deployment of the solar array panel 152, the power distribution controller 160 can route power from the battery 162 to the avionics 62.

As described above in the example of FIGS. 2 and 3, the spacecraft 50 can be designed such that the power provided from the solar cell sections 154 may be substantially more than necessary to provide the adequate amount of power to the avionics 62 and the battery 162. As a result, a portion of the solar cell sections 154 may be deactivated at any given time, such that only a necessary number of the solar cell sections 154 are activated at any given time. The number of the solar cell sections 154 to be activated at a given time can be controlled by a power regulator controller 164. As an example, the power regulator controller 164 can determine the necessary power requirements of the spacecraft 50 at a given time, and in response can command the switches 156 to couple the appropriate number of solar cell sections 154 to the respective power regulators 158.

In addition, as also described above, the location of the portion of the solar cell sections 154 on the solar array panel 152 that are deactivated at a given time can also be controlled to generate a torque on the body 52 of the spacecraft 50. The solar array selection controller 114 can be configured to provide commands to the power regulator controller 164 regarding which of the switches 156 should be disconnected to deactivate the specific corresponding solar cell sections 154 to generate the torque. As an example, the power regulator controller 164 can provide information to the solar array selection controller 114 regarding how many of the solar cell sections 154 are required to be activated to provide the adequate power to the avionics 62. In response, the solar array selection controller 114 can instruct the power magnitude generator 164 which specific solar cell sections 154 to deactivate to generate the torque based on the number of solar cell sections 154 that are required to be activated based on the power requirements. As another example, the solar array selection controller 114 can also be configured to control the state of the switches 156, such that the solar array selection controller 114 can override and/or operate in conjunction with the power regulator controller 164 to deactivate the specific solar cell sections 154 to generate the torque.

It is to be understood that the power system 150 is not intended to be limited to the example of FIG. 5. For example, it is to be understood that the power controller 60 can be coupled to a plurality of solar array panels, not just the solar array panel 152, and can include a respective switch 156 and power regulator 158 for each of the solar cell sections 154 of each of the solar array panels. In addition, it is to be understood that the power system 150 is depicted simplistically in the example of FIG. 5 for the sake of brevity. As such, the power system 150 can include any of a variety of additional components that are not described with regard to the example of FIG. 5. Furthermore, the power regulator controller 164 could be coupled to the power regulators 158, such as to provide partial converting states of the solar cell sections 154 to adjust momentum instead of or in addition to controlling the states of the solar cell sections 154 via the switches 156. Accordingly, the power system 150 can be configured in any of a variety of ways.

Figure 6:
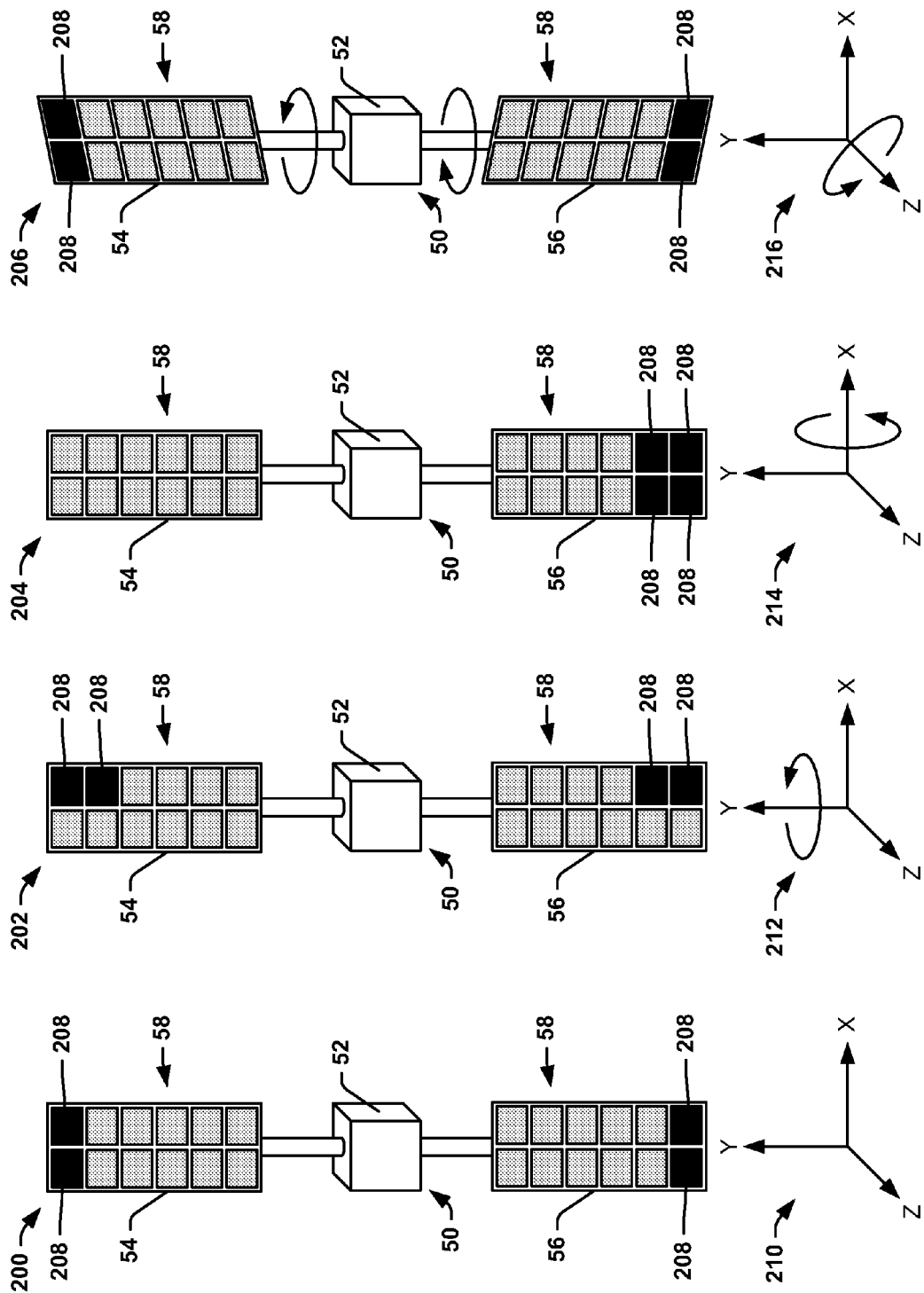
FIG. 6 demonstrates an example of different states of a spacecraft in accordance with an aspect of the invention.

FIG. 6 demonstrates an example of different states of the spacecraft 50 of the example of FIG. 2 in accordance with an aspect of the invention. Reference is to be made to the example of FIG. 2 in the following discussion of the example of FIG. 6.

The spacecraft 50 is demonstrated in the example of FIG. 6 in a first state at 200, a second state at 202, a third state at 204, and a fourth state at 206. The spacecraft 50 is demonstrated as having the first solar array panel 54 and the second solar array panel 56, with each of the first and second solar array panels 54 and 56 including twelve solar cell sections 58, for a total of twenty-four solar cell sections 58. In each of the states 200, 202, 204, and 206, it is to be understood that a power regulator controller, such as the power regulator controller 164 in the example of FIG. 5, has determined that only twenty solar cell sections 58 are necessary to provide adequate power to the avionics 62 (not shown). Therefore, in each of the states 200, 202, 204, and 206, four of the solar cell sections 58 are demonstrated as deactivated at 208. Specifically, in the example of FIG. 6, the deactivated solar cell sections 208 are demonstrated as having a darker shade.

In the first state 200, the spacecraft 50 has the deactivated solar cell sections 208 positioned at the ends of each of the first and second solar array panels 54 and 56. Specifically, the first solar array panel 54 has two deactivated solar cell sections 208 at an end portion furthest away from the body 52 and the second solar array panel 56 has two deactivated solar cell sections 208 at an end portion furthest away from the body 52. The locations of the deactivated solar cell sections 208 are such that they are symmetrical about two axes associated with the body 52 of the spacecraft 50. Specifically, as demonstrated by the Cartesian coordinate system 210, the deactivated solar cell sections 208 are located in a manner that is symmetrical about the X-axis and the Y-axis with respect to an origin that is centered on the body 52 of the spacecraft 50. Therefore, because of the symmetry of the deactivated solar cell sections 208, solar radiation that is provided onto the first and second solar array panels 54 and 56 applies equal solar pressure to each of the first and second solar array panels 54 and 56 with respect to the body of the spacecraft 50. As a result, in the first state 200, the spacecraft 50 experiences an effective torque about the body 52 of approximately zero.

In the second state 202, the spacecraft 50 has the deactivated solar cell sections 208 also positioned at the ends of each of the first and second solar array panels 54 and 56. However, in the second state 202, the spacecraft 50 has two deactivated solar cell sections 208 in the right column of the solar array of the first solar array panel 54 and two deactivated solar cell sections 208 in the right column of the solar array of the second solar array panel 56. Therefore, as demonstrated by the Cartesian coordinate system 212, the locations of the deactivated solar cell sections 208 are such that they are asymmetrical about the Y-axis with respect to the body 52 of the spacecraft 50. Therefore, because of the asymmetry of the deactivated solar cell sections 208 about the Y-axis, solar radiation that is provided onto the first and second solar array panels 54 and 56 applies more solar pressure to the right column with respect to the body of the spacecraft 50. As a result, in the second state 202, the spacecraft 50 experiences a torque about the Y-axis with respect to the body 52.

In the third state 204, the spacecraft 50 has no deactivated solar cell sections 208 on the first solar array panel 54, and has all four of the deactivated solar cell sections 208 positioned at the end of the second solar array panel 56. Therefore, as demonstrated by the Cartesian coordinate system 214, the locations of the deactivated solar cell sections 208 are such that they are asymmetrical about the X-axis with respect to an origin at the center of the body 52 of the spacecraft 50. Therefore, because of the asymmetry of the deactivated solar cell sections 208 about the X-axis, solar radiation that is provided onto the first and second solar array panels 54 and 56 applies more solar pressure to the second solar array panel 56 than the first solar array panel 54. As a result, in the third state 204, the spacecraft 50 experiences a torque about the X-axis with respect to the body 52.

In the fourth state 206, the spacecraft 50 has deactivated solar cell sections 208 positioned at the ends of each of the first and second solar array panels 54 and 56. Specifically, the deactivated solar cell sections 208 are positioned the same as demonstrated in the first state 200. The locations of the deactivated solar cell sections 208 are such that they are symmetrical about both the X-axis and the Y-axis, as demonstrated by the Cartesian coordinate system 216 with respect to an origin that is centered on the body 52 of the spacecraft 50. However, in the fourth state 206, the body 52 of the spacecraft 50 is demonstrated as rotating the first solar array panel 54 in a right-hand manner with respect to the +Y-axis and rotating the second solar array panel 56 in a right-hand manner with respect to the −Y-axis. Therefore, solar radiation that is provided onto the first and second solar array panels 54 and 56 applies equal solar pressure to each of the first and second solar array panels 54 and 56 with respect to the body of the spacecraft 50, but the radiation is reflected in opposite vectors (i.e., the +X and the −X directions) with respect to the body 52. As a result, in the fourth state 206, the spacecraft 50 experiences an effective torque about the Z-axis with respect to the body 52.

It is to be understood that the spacecraft 50 is not limited to the four states depicted in the example of FIG. 6. As an example, the deactivated solar cell sections 208 can be switched to locations so as to provide a torque about more than just a single axis, such that the four states depicted in the example of FIG. 6 can be combined in one or more ways. For example, multiple axes of motion can be accomplished by skewing the first and second solar array panels 54 and 56, as demonstrated by the fourth state 206, with selective deactivation of one or more of the solar cell sections 58. Furthermore, although the example of FIG. 6 depicts that the solar cell sections 58 having the most extreme moment arm relative to the body 52 are demonstrated as deactivated, any of the solar cell sections 58 along the length of the first and second solar array panels 54 and 56 can be deactivated, or switched to a partially converting state, to vary the torque. Accordingly, the solar cell sections 58 can be deactivated in any of a variety of ways to unload momentum of the spacecraft 50.

Figure 7:
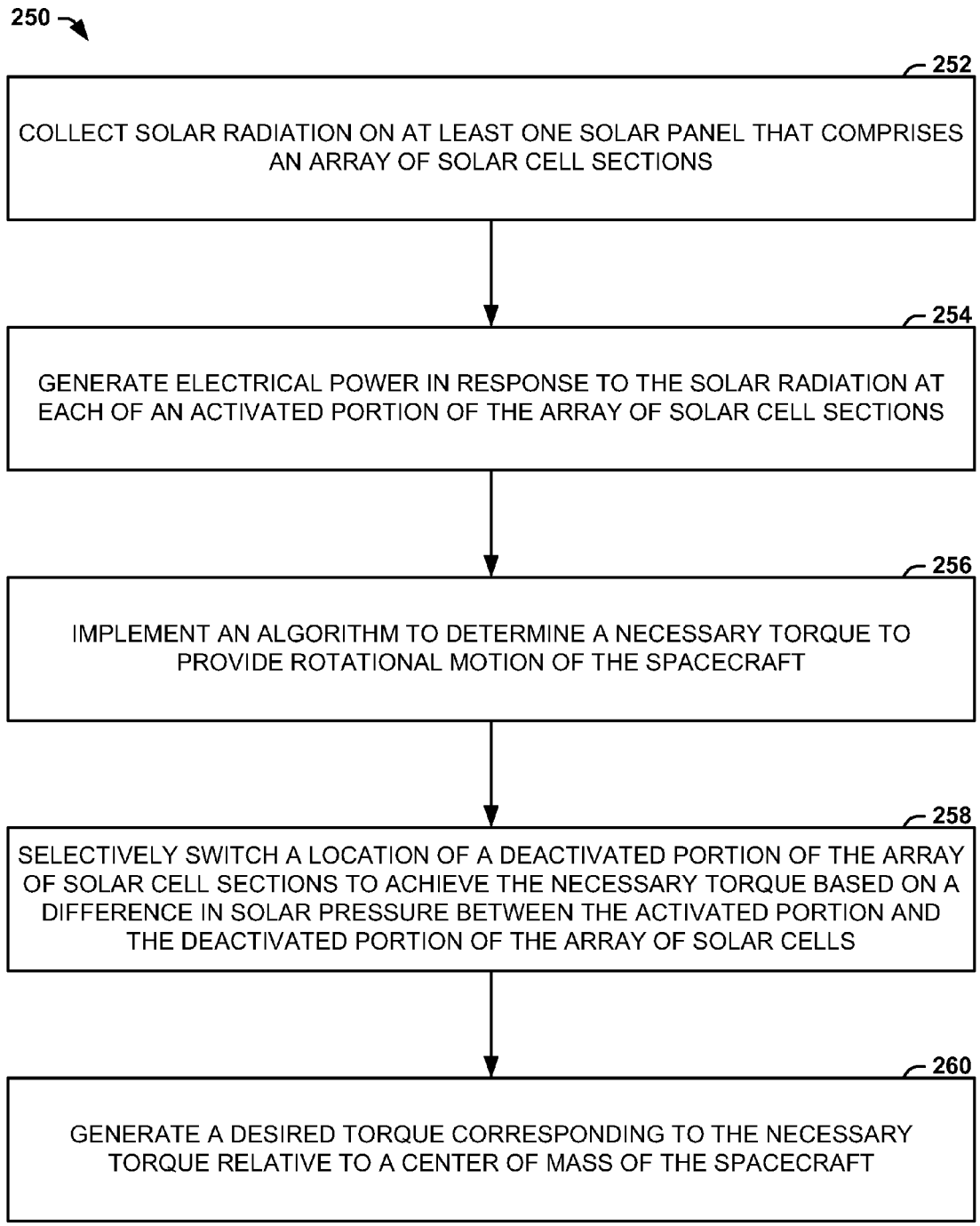
FIG. 7 demonstrates a method for adjusting momentum in a spacecraft in accordance with an aspect of the invention.

In view of the foregoing structural and functional features described above, a methodology in accordance with various aspects of the present invention will be better appreciated with reference to FIG. 7. While, for purposes of simplicity of explanation, the methodologies of FIG. 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 demonstrates a method 250 for adjusting momentum in a spacecraft in accordance with an aspect of the invention. The spacecraft could be a satellite in a geosynchronous earth orbit. At 252, solar radiation is collected on at least one solar array panel that comprises an array of solar cell sections. At 254, electrical power is generated in response to the solar radiation at each of an activated portion of the array of solar cell sections. The spacecraft can be designed such that it has power requirements that are less than a total power that can be generated by all of the solar cell sections. Thus, the at least one solar array panel can also include a deactivated portion. At 256, an algorithm is implemented to ascertain a necessary torque to provide rotational motion of the spacecraft. The necessary torque can be to orient the spacecraft for a desired directional pointing of the spacecraft, or could be to counteract perturbing environmental forces that are applied to the spacecraft.

At 258, a location of a deactivated portion of the array of solar cell sections is selectively switched to achieve the necessary torque based on a difference in solar pressure between the activated portion of the array of solar cell sections and the deactivated portion of the array of solar cell sections. The deactivated portion of the array of solar cell sections can be reconfigured, such that the same number of solar cell sections are activated before and after the selective switching. The selective switching can be based on coupling and decoupling solar cell sections to respective power regulators via respective switches. At 260, a desired torque corresponding to the necessary torque is generated relative to a center of mass of the spacecraft. The torque can be commensurate with the necessary torque to provide the rotational motion of the spacecraft or to unload spacecraft momentum.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A spacecraft comprising:
   at least one solar array panel comprising an array of solar cell sections, each solar cell section being configured to generate electrical power from received solar radiation; and
   a solar array selection controller configured to selectively deactivate a first portion of the array of solar cell sections to generate a torque on the spacecraft based on a difference in at least one of solar and thermal radiation pressure between an activated second portion of the array of solar cell sections and the deactivated first portion of the array of solar cell sections.

2. The spacecraft of claim 1, further comprising a reference unit configured to determine an attitude of the spacecraft, the torque being generated to control the attitude of the spacecraft.

3. The spacecraft of claim 2, wherein the reference unit is configured to determine the attitude of the spacecraft in response to perturbing environmental forces acting upon the spacecraft, the torque being generated to counteract the perturbing environmental forces.

4. The spacecraft of claim 3, wherein the solar array selection controller is configured to selectively deactivate the first portion of the array of solar cell sections to unload momentum in response to the attitude of the spacecraft.

5. The spacecraft of claim 3, wherein the solar array selection controller is configured to determine at least one of timing and selection information associated with the deactivated first portion of the array of solar cell sections to generate the torque based on the attitude of the spacecraft.

6. The spacecraft of claim 1, wherein the spacecraft is a satellite in a geosynchronous orbit (GEO).

7. The spacecraft of claim 1, wherein the at least one solar array panel comprises two solar array panels symmetrically disposed about two axes of a body of the spacecraft, the deactivated first portion of the array of solar cell sections being asymmetrical about at least one of the two axes of the body of the spacecraft.

8. The spacecraft of claim 1, wherein the torque adjusts momentum accumulation associated with the spacecraft, the spacecraft further comprising a plurality of reaction wheels configured to accumulate momentum associated with the spacecraft.

9. The spacecraft of claim 1, further comprising a power controller that comprises a plurality of power regulators that are each associated with a respective solar cell section, the solar array selection controller being configured to activate and deactivate the array of solar cell sections based on controlling a state of a plurality of switches that each couple one of the solar cell sections to a respective one of the plurality of power regulators.

10. The spacecraft of claim 9, wherein the power controller is configured to switch one or more of the solar cell sections to a partially converting state via a respective one or more of the plurality of power regulators to provide a fine adjustment to the torque on the spacecraft.

11. A method for controlling momentum in a spacecraft, the method comprising:
    collecting solar radiation on at least one solar array panel that comprises an array of solar cell sections;
    generating electrical power in response to the solar radiation at each of an activated portion of the array of solar cell sections;
    determining a necessary torque to provide rotational motion of the spacecraft; and
    selectively switching a location of a deactivated portion of the array of solar cell sections on the at least one solar array panel to generate a torque on the spacecraft based on a difference in at least one of solar and thermal radiation pressure between the activated portion of the array of solar cell sections and the deactivated portion of the array of solar cell sections, the torque being commensurate with the necessary torque to provide the rotational motion of the spacecraft.

12. The method of claim 11, further comprising determining an attitude of the spacecraft to implement an algorithm.

13. The method of claim 12, wherein implementing the algorithm comprises implementing the algorithm to ascertain the necessary torque to counteract perturbing environmental forces acting upon the spacecraft.

14. The method of claim 12, wherein implementing the algorithm comprises implementing the algorithm to ascertain the necessary torque to maintain a desired directional pointing control of the spacecraft.

15. The method of claim 11, wherein the at least one solar array panel comprises two solar array panels symmetrically disposed about two axes of a body of the spacecraft, and wherein selectively switching comprises selectively switching the location of the deactivated portion of the array of solar cell sections asymmetrically about at least one of the two axes of the body of the spacecraft.

16. The method of claim 11, wherein generating electrical power comprises converting solar radiation into electrical power at a plurality of power regulators that are each associated with a respective solar cell section, and wherein selectively switching comprises activating and deactivating a plurality of switches that each couple one of the solar cell sections to a respective one of a plurality of power regulators.

17. A spacecraft comprising:
    plural means for converting solar radiation into electrical power; and
    means for selectively deactivating a portion of the plural means for converting in a manner that is asymmetrical about at least one of two axes of the spacecraft to generate a torque on the spacecraft based on a difference in at least one of solar and thermal radiation pressure between an activated portion of the plural means for converting and the deactivated portion of the plural means for converting.

18. The spacecraft of claim 17, further comprising means for determining an attitude of the spacecraft, the torque being generated to control the attitude of the spacecraft.

19. The spacecraft of claim 17, further comprising means for determining a necessary torque associated with the torque for at least one of counteracting perturbing environmental forces acting upon the spacecraft and maintaining a desired directional pointing control of the spacecraft.

20. The spacecraft of claim 17, further comprising:
    means for regulating the electrical power associated with each of the plural means for converting; and
    means for switching associated with each of the plural means for converting;
    wherein the means for selectively deactivating is further configured to control the means for switching to activate and deactivate the means for switching to selectively couple the plural means for converting to a respective one of the means for regulating.

* * * * *